United States Patent
Uematsu et al.

[11] Patent Number: 6,019,573
[45] Date of Patent: Feb. 1, 2000

[54] HEAT RECOVERY TYPE GAS TURBINE

[75] Inventors: Kazuo Uematsu; Kiyoshi Suenaga, both of Takasago, Japan

[73] Assignee: Mitsubishi Heavy Industries, Ltd., Tokyo, Japan

[21] Appl. No.: 09/015,211

[22] Filed: Jan. 29, 1998

[51] Int. Cl.[7] .............. F01D 25/08; F01D 5/18; F01D 5/08
[52] U.S. Cl. ............ 415/115; 415/114; 415/116; 415/117; 416/96 R; 416/97 R
[58] Field of Search ................ 415/114, 116, 415/115, 117; 416/96 R, 97 R; 60/39.75

[56] References Cited

U.S. PATENT DOCUMENTS

| 4,173,120 | 11/1979 | Grosjean et al. ............ 60/39.16 R |
| 5,253,976 | 10/1993 | Cunha ........................ 415/114 |
| 5,758,487 | 11/1996 | Salt et al. ................... 60/39.75 |

FOREIGN PATENT DOCUMENTS

| 0 735 238 | 10/1996 | European Pat. Off. . |
| 0 735 243 | 10/1996 | European Pat. Off. . |
| 0 735 254 | 10/1996 | European Pat. Off. . |
| 2 307 520 | 5/1997 | United Kingdom . |

*Primary Examiner*—F. Daniel Lopez
*Assistant Examiner*—Rhonda Barton
*Attorney, Agent, or Firm*—Wenderoth, Lind & Ponack, L.L.P.

[57] ABSTRACT

In a steam cooled type gas turbine, taking the effect of efficiency and power output into consideration, a rear stage is sufficiently cooled by air in place of cooling all of the stages by steam. In a rotor of the gas turbine having a steam cooled moving blade, a moving blade disposed in a front stage is cooled by steam, and a moving blade disposed at the rear stage is cooled by cooling air through a stationary blade disposed in front of the moving blade at the rear stage.

7 Claims, 2 Drawing Sheets

HEAT RECOVERY TYPE GAS TURBINE

BACKGROUND OF THE INVENTION

1. Field of the Invention

The present invention relates to a rotor for a gas turbine having a steam cooled moving blade and an air cooled moving blade.

2. Description of the Related Art

In order to improve the thermal efficiency of a gas turbine, cooling a moving blade for a gas turbine by steam is considered. With such a structural arrangement, it is necessary to provide a new rotor having a passage for supplying steam to the moving blade for the turbine and recovering the steam after performing the cooling function.

In this case, extraction steam from a steam turbine in a combined cycle plant and the like are used as cooling steam. However, for reasons of the cycle of the steam, leakage thereof is limited to the utmost.

FIG. 2 is a cross sectional view of a turbine portion in a gas turbine having a conventional steam cooled moving blade. As shown in FIG. 2, the cooling steam is supplied from the direction of the final stage side of a rotor 31 through a hole 33 having a gap for a spindle bolt 32 of the rotor, and then flows into a front chamber 34 of a first stage moving blade. Then, after cooling a rotor 35 and a moving blade 36 while flowing therethrough, the cooling steam is passed sequentially through a second stage rotor 37 and a second stage moving blade 38 having the same configuration, respectively, so as to cool them, and is then recovered from a cooling steam hole 39 in the final stage rotor 31.

The cooling steam for the steam cooled moving blade is supplied and recovered through the route mentioned above. However, taking efficiency and power output into consideration, it is possible to cool with a slight amount of air in a rear stage (the third stage moving blade shown in the illustrated embodiment).

However, in the structure shown in FIG. 2, since the passage for supplying and recovering the cooling steam is complex, even when only a part of the moving blades is cooled by air, there is no way to provide a passage for cooling air in the rotor end. It is thus difficult to provide for cooling air.

SUMMARY OF THE INVENTION

The present invention has been developed by taking the above points into consideration, with the object of providing a structure of the type having both steam cooling and air cooling.

In order to achieve the object mentioned above, there is provided a heat recovery type gas turbine comprising a rotor for a gas turbine having a steam cooled moving blade, in which a moving blade disposed in a front stage is cooled by steam and a moving blade disposed at a rear stage is cooled by air. The moving blade disposed at the front end, which largely affects the efficiency and the power output, is thus cooled by steam, and the moving blade disposed at the rear end, which has less affect on efficiency and power output, is cooled by air.

Further, in accordance with the present invention, there is provided a heat recovery type gas turbine in which the moving blade disposed at the rear stage is supplied with cooling air through a stationary blade disposed in front of the moving blade. Supply of the cooling air to the moving blade is performed by introducing cooling air through an outer shroud, a stationary blade body and an inner shroud of the stationary blade disposed in front of the moving blade.

Still further, in accordance with the present invention, there is provided a heat recovery type gas turbine in which a stationary blade passing cooling air therethrough forms a flow passage from the stationary blade to a moving blade through the rotor. A cooling air communicating portion from the stationary blade to the rotor is positioned inside a cooled portion of the moving blade and a cooling air outlet port with respect to the direction of the rotor radius. The cooling air is thus supplied to the moving blade through the rotor from the stationary blade. The position for communicating the cooling air from the stationary blade to the rotor is set to a position disposed inside the portion to be cooled of the rear moving blade and an outlet position for the cooling air communicating with the portion to be cooled of the rear moving blade with respect to the radial direction of the rotor. The cooling air is thus securely communicated by using a pressure difference between both the positions.

DETAILED DESCRIPTION OF THE PREFERRED EMBODIMENT

Figure 1:
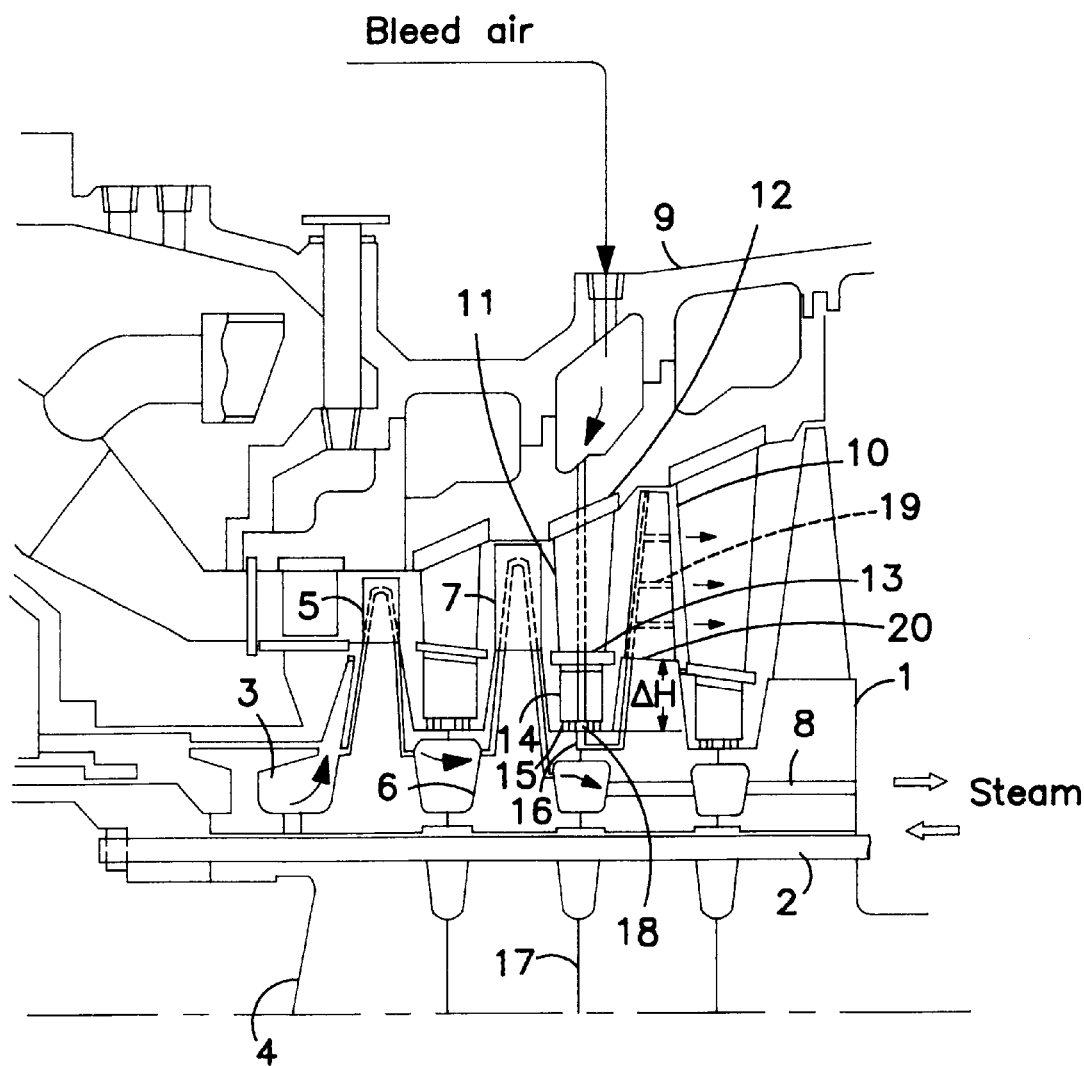
FIG. 1 is a cross sectional view which shows a steam-air cooled turbine in accordance with an embodiment of the invention.
Figure 2:
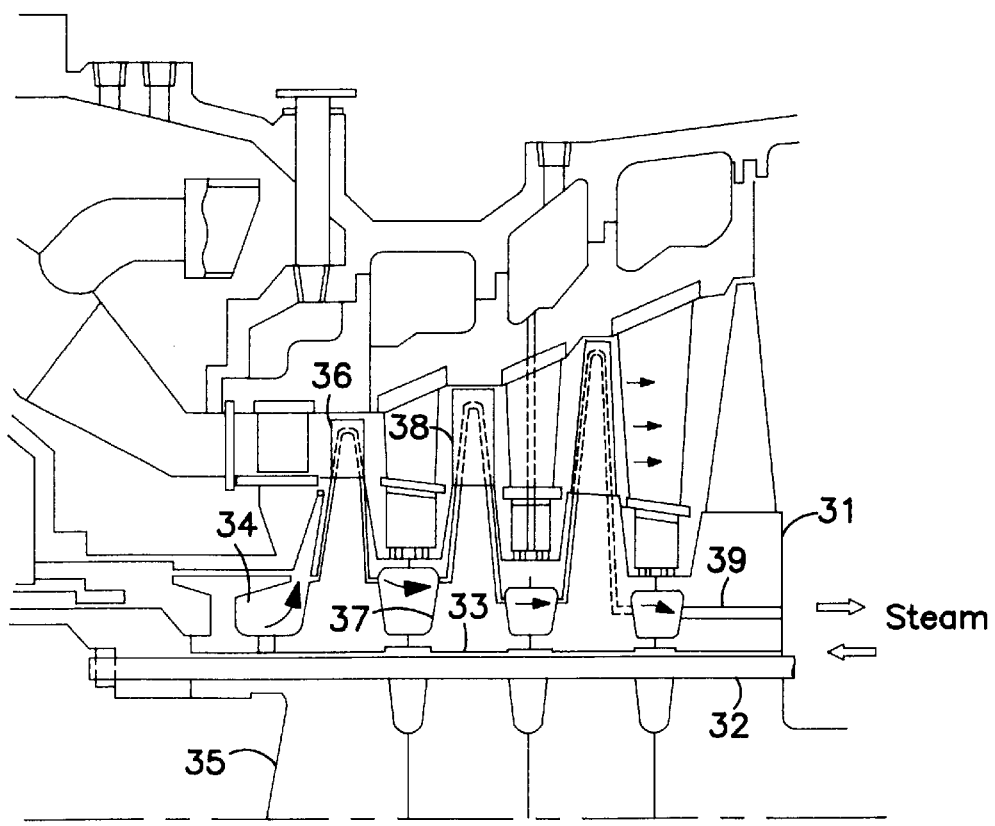
FIG. 2 is a cross sectional view which shows a conventional steam cooled turbine.

Reference numeral 1 denotes a rotor disposed at a final stage formed by a disc-like member (a disc), and reference numeral 2 denotes a spindle bolt for forming a combined body of moving blades by integrally combining a plurality of disc-like members (discs). Reference numeral 3 denotes a first stage moving blade front chamber formed in front of a first stage moving blade 5. Reference numeral 4 denotes a rotor disposed in a first stage having an outer periphery into which the first stage moving blade 5 is inserted. Reference numeral 6 denotes a second stage rotor disposed so as to continue the rotor 4 disposed in the first stage.

Reference numeral 7 denotes a second stage moving blade, which is disposed downstream of the first stage moving blade 5 with a stationary blade interposed therebetween. Similarly, reference numeral 10 denotes a third stage moving blade disposed downstream of the second stage moving blade 7 with another stationary blade 11 interposed therebetween. In this case, the third stage moving blade 10 has a structure cooled by air, so that it can also be called an air cooled moving blade.

Reference numeral 12 denotes an outer shroud constituting a part of the stationary blade 11. Reference numeral 13 denotes an inner shroud disposed at an opposite end thereof and reference numeral 14 denotes an inner shroud lower portion extending further inward from the inner shroud 13. Reference numeral 15 denotes a seal fin disposed at the inner shroud lower portion 14 and extending toward the rotor.

Reference numeral 16 denotes a hole for supplying cooling air, and a plurality of holes 16 are provided in a peripheral direction from a cooling air communicating portion 18 defined and formed by the seal fin 15 through an inner portion of a third stage rotor 17. A downstream end thereof is communicated with a cooling air outlet port 20 communicating with a portion 19 of the air cooled moving blade (the third stage moving blade) 10 to be cooled.

The positional relation between the cooling air communicating portion 18 and the cooling air outlet port 20 communicated with each other by the hole 16 is that the former is disposed inside the latter with respect to the radial direction.

In this case, reference numeral 8 denotes a cooling steam hole for guiding a cooling steam supplied to the first stage moving blade 5 and the second stage moving blade 7, and reference numeral 9 denotes a casing for receiving each of the moving blades and the stationary blades therein.

In accordance with this embodiment, having the above structure, the cooling steam is supplied from a direction of the final stage end rotor 1 through the hole having the gap for the spindle bolt 2 of the rotor and flows into the first stage moving blade front chamber 3. Then, after cooling the rotor 4 and the moving blade 5 while flowing therethrough, the cooling steam cools the second stage rotor 6 and the second stage moving blade 7 of the same type in order and is recovered from the cooling steam hole 8 of the final stage rotor 1.

On the contrary, with the cooling air, bleed air bled from a gas turbine compressor (not shown) is introduced to the casing 9 and is passed through the outer shroud 12, the inner portion of the stationary blade 11, the inner shroud 13, and a hole of the inner shroud lower portion 14 to the seal fin portion 15 in the stationary blade 11 in front of the moving blade 10. Then, the cooling air discharged to the seal fin portion 15 flows into the rotor 17 and the moving blade 10 through the plurality of holes 16 disposed in the outer periphery of the rotor 17. However, the cooling air discharged to the seal fin portion 15 is sucked from the rotor hole by a magnitude of an absolute value of a bleeding pressure and a pump action effect due to a difference $\Delta H$ in a height position between the rotor inlet hole and the rotor outlet port so as to securely flow into the moving blade 10. Thereafter it is finally discharged to the main gas flow.

In accordance with this embodiment, it is possible to cool by air with a suitably installed air cooling means without the cooling air interfering with the steam cooled structure.

As mentioned above, the invention has been described in accordance with the embodiment. However, the invention is not limited to the embodiment, and it is a matter of course that various changes can be made to the concrete structure within the scope of the invention.

As mentioned above, in accordance with the heat recovery type gas turbine rotor of the invention, it is possible to avoid an unnecessarily complex structure in the steam cooled gas turbine for improving efficiency and power output and to cool by both steam and air with a simpler structure.

Further, since an intake of the cooling air is through the inner portion of the stationary blade disposed in front of the moving blade to which air cooling is applied, the structure as a whole can be made simple and compact.

Still further, the cooling air passing through the stationary blade and the rotor to the object moving blade can be securely and accurately moved by the pressure difference between the transfer position form the stationary blade to the rotor and the transfer position to the moving blade so that the desired cooling function can be achieved.

What is claimed is:

1. A heat recovery type gas turbine, comprising:

a turbine front stage comprising a front stage gas turbine rotor and a steam cooled moving blade connected thereto;

a turbine rear stage comprising a rear stage gas turbine rotor and an air cooled moving blade connected thereto; and a stationary blade in front of said air cooled moving blade, wherein cooling air for cooling said air cooled moving blade is supplied through said stationary blade.

2. The heat recovery type gas turbine of claim 1, wherein:

said stationary blade forms a flow passage for cooling air from said stationary blade to said air cooled moving blade together with said rear stage gas turbine rotor which includes a cooling air communicating portion from said stationary blade to said rear stage gas turbine rotor and a cooling air outlet port from said rear stage gas turbine rotor to said air cooled moving blade; and said cooling air communicating portion is positioned radially inside of said cooling air outlet port and a cooled portion of said air cooled moving blade with respect to the radial direction of said rear stage gas turbine rotor.

3. The heat recovery type gas turbine of claim 1, wherein said stationary blade comprises a cooling air passage extending through an outer shroud thereof to an inner shroud thereof, said cooling air passage being in fluid communication with a rotor cooling passage extending through said rear stage gas turbine rotor to said air cooled moving blade.

4. The heat recovery type gas turbine of claim 3, wherein said stationary blade has a lower portion through which said cooling air passage extends and a seal fin extending toward said rear stage gas turbine rotor from said lower portion.

5. The heat recovery type gas turbine of claim 1, wherein said steam cooled moving blade is not cooled by air.

6. The heat recovery type gas turbine of claim 5, wherein said air cooled moving blade is not cooled by steam.

7. The heat recovery type gas turbine of claim 1, wherein said air cooled moving blade is not cooled by steam.

* * * * *